United States Patent
Hooker et al.

(10) Patent No.: US 6,327,520 B1
(45) Date of Patent: *Dec. 4, 2001

(54) PLANAR NORMALITY SENSOR

(75) Inventors: Jeff Hooker; Steve Simmons, both of Melbourne, FL (US)

(73) Assignee: Intelligent Machine Concepts, L.L.C., New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/386,835

(22) Filed: Aug. 31, 1999

(51) Int. Cl.[7] .............................. G05B 19/00; G01B 11/14

(52) U.S. Cl. ............................................ 700/259; 356/614

(58) Field of Search ..................................... 700/245, 253, 700/258, 259; 356/222, 226, 218–221, 450, 485–486, 601–608, 622–623, 928–929, 934, 939, 942–943, 614; 342/89–90, 123–132, 147, 158

(56) References Cited

U.S. PATENT DOCUMENTS

| | | | |
|---|---|---|---|
| 3,888,362 | 6/1975 | Fletcher et al. | 214/1 B |
| 4,118,730 | 10/1978 | Lemelson | 358/93 |
| 4,148,061 | 4/1979 | Lemelson | 358/101 |
| 4,338,626 | 7/1982 | Lemelson | 358/93 |
| 4,379,731 | 4/1983 | Long et al. | 156/356 |
| 4,419,384 | 12/1983 | Kane et al. | 427/57 |
| 4,511,918 | 4/1985 | Lemelson | 358/107 |
| 4,564,410 | 1/1986 | Clitheros et al. | 156/356 |
| 4,639,878 | 1/1987 | Day et al. | 364/513 |
| 4,639,963 | 2/1987 | Fisher | 12/1 |
| 4,662,752 | 5/1987 | Tucker et al. | 356/375 |
| 4,728,378 | 3/1988 | Bianchi | 156/64 |
| 4,819,167 | 4/1989 | Cheng et al. | 364/167.01 |
| 4,831,316 | 5/1989 | Ishiguro et al. | 318/568.13 |
| 4,831,561 | 5/1989 | Utsumi | 364/560 |
| 4,866,802 | 9/1989 | Stein et al. | 12/1 |
| 4,951,338 | 8/1990 | Brown et al. | 12/77 |
| 4,969,038 | 11/1990 | Lemelson | 358/107 |
| 4,979,029 | 12/1990 | Lemelson | 358/93 |
| 4,984,073 | 1/1991 | Lemelson | 358/93 |
| 5,006,999 | 4/1991 | Kuno et al. | 364/513 |
| 5,023,714 | 6/1991 | Lemelson | 358/107 |

(List continued on next page.)

FOREIGN PATENT DOCUMENTS

| | | | |
|---|---|---|---|
| 0 512 773 A1 | 11/1992 | (EP) | A43D/119/00 |
| 0 588 054 A1 | 8/1993 | (EP) | A43D/25/18 |
| 0 678 250 A2 | 10/1995 | (EP) | A43D/25/18 |
| 2 630 957 | 11/1989 | (FR) | B25J/19/04 |
| 2210427 A | 6/1983 | (GB) | G05B/19/42 |
| 2158269 A | 11/1985 | (GB) | B25J/19/04 |
| 405337002 A | 12/1993 | (JP) | A43D/25/18 |
| WO 91/17021 | 11/1991 | (WO) | B23Q/15/22 |

OTHER PUBLICATIONS

"FN—Footwear News," vol. 51, No. 49, Dec. 4, 1995. (Cover + 3 pages).

(List continued on next page.)

Primary Examiner—William A. Cuchlinski, Jr.
Assistant Examiner—Thu Nguyen
(74) Attorney, Agent, or Firm—Allen, Dyer, Doppelt, Milbrath & Gilchrist, P.A.

(57) ABSTRACT

A sensor determines the planar inclination of a surface and includes a sensor body having a light emitting end. Three Z-axis sensors are positioned within the sensor body. Each Z-axis sensor includes a laser assembly having a light output for emitting a light beam from the light emitting end onto a surface to be scanned. An optical detector receives reflected light that had been emitted from the laser assembly onto a surface to be scanned. A processor is operatively connected to the optical detectors and calculates the planar inclination of the surface based on the light scattered back from the surface to be scanned. Each laser assembly has a sine wave modulation that is different from the sine wave modulation of a respective other laser assembly. The sine wave modulation is a function of amplitude, frequency modulation, DC offset, time and phase.

42 Claims, 12 Drawing Sheets

U.S. PATENT DOCUMENTS

| | | | |
|---|---|---|---|
| 5,067,012 | 11/1991 | Lemelson | 358/93 |
| 5,094,538 | 3/1992 | Reedman et al. | 356/376 |
| 5,102,280 | 4/1992 | Poduje et al. | 414/225 |
| 5,110,615 | 5/1992 | Maiorca et al. | 427/8 |
| 5,119,190 | 6/1992 | Lemelson | 358/93 |
| 5,119,205 | 6/1992 | Lemelson | 358/93 |
| 5,128,753 | 7/1992 | Lemelson | 358/101 |
| 5,131,753 | 7/1992 | Pine et al. | 356/375 |
| 5,131,754 | 7/1992 | Hasegawa | 356/375 |
| 5,136,974 | 8/1992 | Lisec | 118/673 |
| 5,144,421 | 9/1992 | Lemelson | 358/101 |
| 5,177,563 | 1/1993 | Everett et al. | 356/375 |
| 5,181,079 | 1/1993 | Klinger | 356/375 |
| 5,196,900 | 3/1993 | Pettersen | 356/141 |
| 5,249,045 | 9/1993 | Lemelson | 358/93 |
| 5,261,958 | 11/1993 | Davies | 118/696 |
| 5,271,953 | 12/1993 | Litteral | 427/8 |
| 5,280,436 | 1/1994 | Kubota et al. | 364/559 |
| 5,280,542 | 1/1994 | Ozeki et al. | 382/8 |
| 5,283,641 | 2/1994 | Lemelson | 348/92 |
| 5,298,977 | 3/1994 | Shintani et al. | 356/375 |
| 5,329,351 | 7/1994 | Clementi | 356/237 |
| 5,331,406 | 7/1994 | Fishbaine et al. | 356/375 |
| 5,332,352 | 7/1994 | Poduje et al. | 414/225 |
| 5,351,078 | 9/1994 | Lemelson | 348/135 |
| 5,379,106 | 1/1995 | Baldur | 356/375 |
| 5,383,118 | 1/1995 | Nguyen | 364/167.01 |
| 5,437,727 | 8/1995 | Yoneda et al. | 118/669 |
| 5,452,440 | 9/1995 | Salsburg | 395/463 |
| 5,452,447 | 9/1995 | Nelson et al. | 395/650 |
| 5,456,561 | 10/1995 | Poduje et al. | 414/225 |
| 5,457,796 | 10/1995 | Thompson | 395/600 |
| 5,463,463 | 10/1995 | Harvey et al. | 356/375 |
| 5,465,350 | 11/1995 | Fueki | 395/600 |
| 5,495,457 | 2/1996 | Takagi | 369/30 |
| 5,506,682 | 4/1996 | Pryor | 356/375 |
| 5,511,005 | 4/1996 | Abbe et al. | 364/552 |
| 5,513,336 | 4/1996 | Vishlitzky et al. | 395/463 |
| 5,541,485 | 7/1996 | Teichmann et al. | 318/568.21 |
| 5,550,998 | 8/1996 | Willis et al. | 395/441 |
| 5,563,798 | 10/1996 | Berken et al. | 364/478.06 |
| 5,748,321 | * 5/1998 | Burks et al. | 356/386 |
| 5,831,719 | * 11/1998 | Berg et al. | 356/5.13 |
| 5,896,228 | * 4/1999 | Inoue et al. | 359/555 |

OTHER PUBLICATIONS

"Footwear Business International," Mar. 1996. (Cover + exhibition review 9–13).

"World Footwear," vol. 9, No. 6, Nov./Dec. 1995. (Cover + shoetech '95).

"American Shoemaking," vol. 369, No. 9, Sep. 1995. (Cover + shoetech 1995).

"American Shoemaking," vol. 369, No. 12, Dec. 1995. (Cover + p. 35).

"American Shoemaking," vol. 370, No. 1, Jan. 1996. (Cover + p. 42–43).

"American Shoemaking," vol. 370, No. 2, Feb. 1996. (Cover + p. 19–21).

* cited by examiner

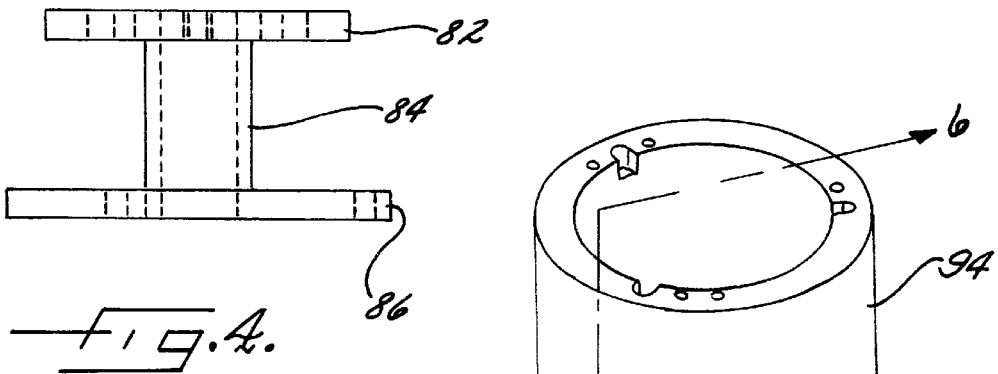
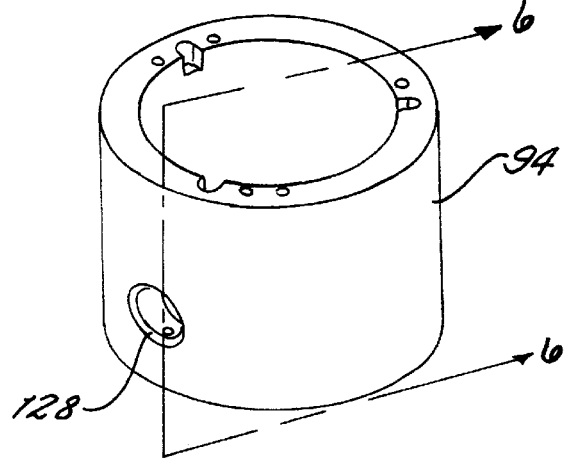
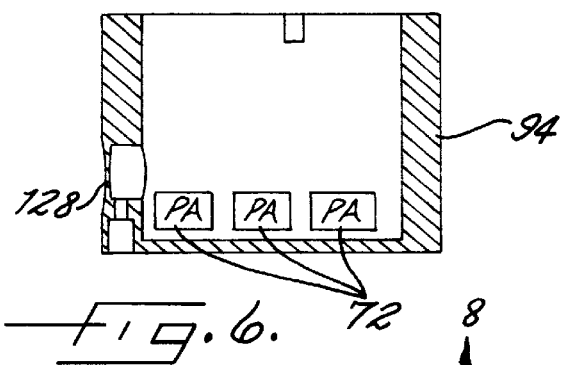
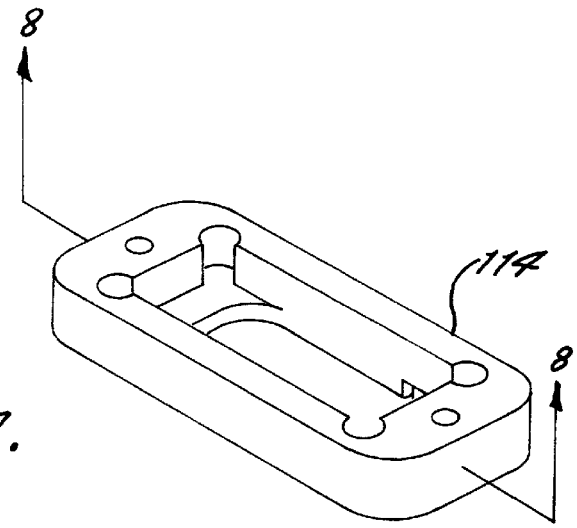
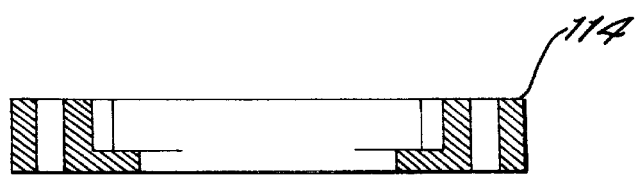

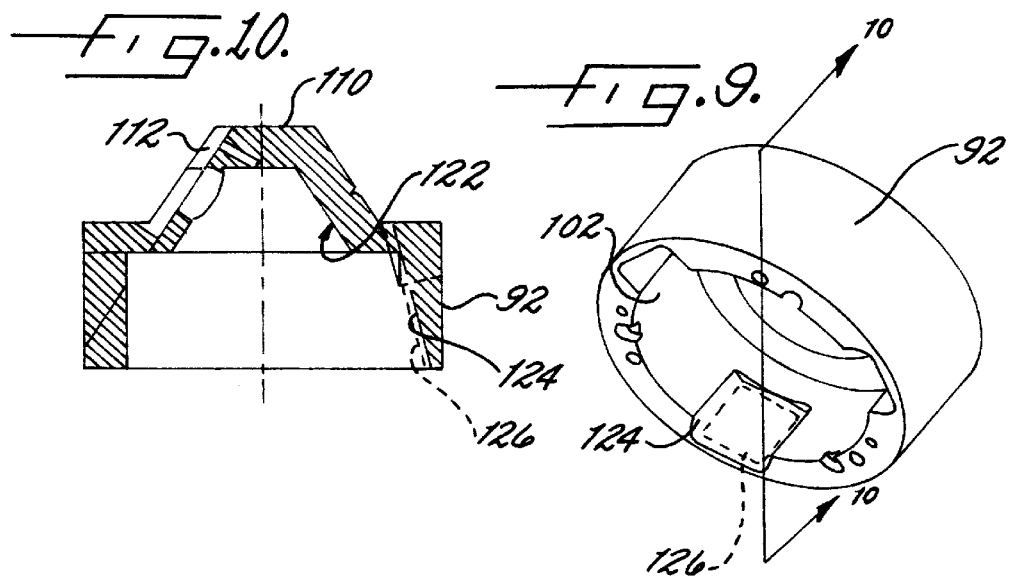
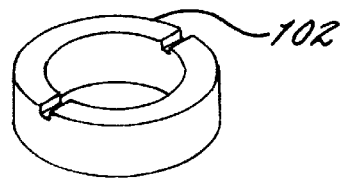
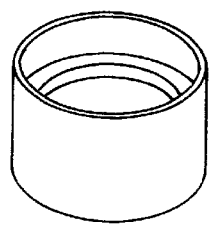
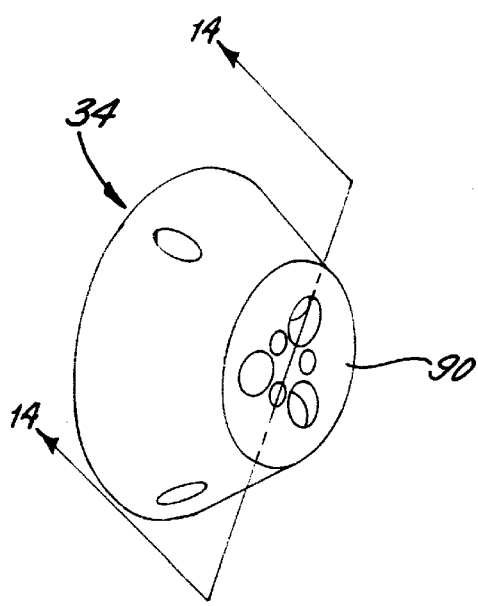
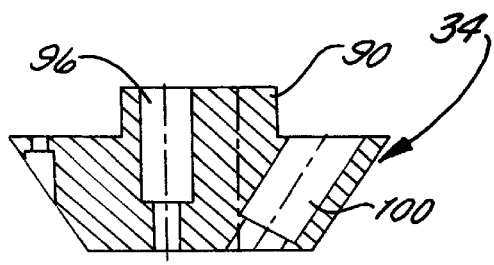

$f := 5 \quad D := 512 \quad K := 30 \quad P := .21 \quad dP := P \cdot 0$ $S(n) := \dfrac{n}{K} \qquad POSITION(t) := P + t \cdot dP \qquad INTENSITY(t) := D \cdot \left(.01 + .000 \cos\left(\dfrac{60 \cdot t}{f \cdot 1000}\right)\right)$ $DRIVE(t) := D \cdot \sin(2 \cdot \pi \cdot f \cdot t)$
$LEFT(t) := drive(t) \cdot (1 - POSITION(t)) \cdot INTENSITY(t)$
$RIGHT(t) := drive(t) \cdot (1 + POSITION(t)) \cdot INTENSITY(t)$

*Fig. 18.*

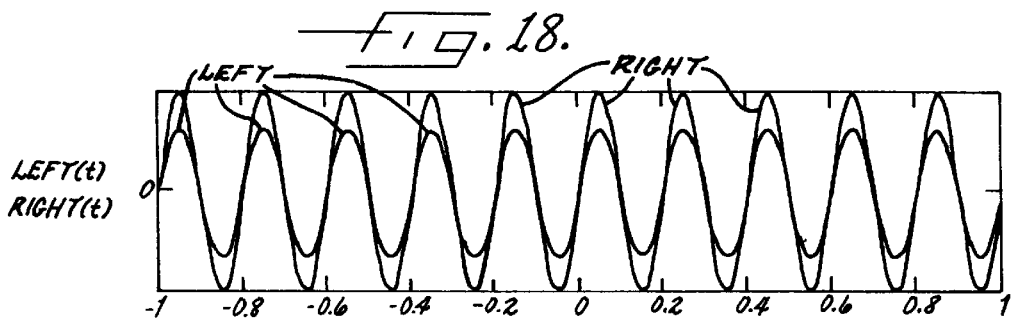

*Fig. 19.*

$cy := 1$ $\dfrac{\left(\int_0^{cy} RIGHT(t) \cdot DRIVE(t)\,dt - \int_0^{cy} LEFT(t) \cdot DRIVE(t)\,dt\right)}{\left(\int_0^{cy} RIGHT(t) \cdot DRIVE(t)\,dt + \int_0^{cy} LEFT(t) \cdot DRIVE(t)\,dt\right)} = 0.21 \qquad \dfrac{POSITION(cy) + POSITION(0)}{2} = .21$ $lds := \displaystyle\sum_{m=0}^{K-1} LEFT(S(m)) \cdot DRIVE(S(m)) \qquad\qquad lds = 1.59 \cdot 10^7$ $rds := \displaystyle\sum_{m=0}^{K-1} RIGHT(S(m)) \cdot DRIVE(S(m)) \qquad\qquad rds = 2.436 \cdot 10^7$ $\dfrac{(rds - lds)}{(rds + lds)} = 0.21$

*Fig. 20.*

$$lds := \sum_{m=0}^{K-1} TRUNC(LEFT(S(m))) \cdot TRUNC(DRIVE(S(m))+.5)$$

$$rds := \sum_{m=0}^{K-1} TRUNC(RIGHT(S(m))) \cdot TRUNC(DRIVE(S(m))+.5)$$

$rds-lds = 8.434 \cdot 10^6$   $rds+lds = 4.017 \cdot 10^7$   $\dfrac{(rds-lds)}{(rds+lds)} = 0.21$ $rds = 2.43 \cdot 10^7$ $lds = 1.587 \cdot 10^7$ $POSITION(cy) = 0.21$ $k := 16$ $r := \begin{bmatrix} 2 \\ 3 \\ 5 \end{bmatrix}$  $M := \prod_{k=0}^{2} r_k$  $f := \begin{bmatrix} \frac{M}{r_2 \cdot 2} \\ \frac{M}{r_1 \cdot 2} \\ \frac{M}{r_0 \cdot 2} \end{bmatrix}$ $M = 30$ SAMPLERATE := 2·max(f)   MINIMUM SAMPLERATE = 10

$\sin(2\pi f_0 t)$
$\sin(2\pi f_1 t)$
$\sin(2\pi f_2 t)$

Fig. 26.

$$\sum_{k=0}^{K-1} \sin(2\pi \cdot f_0 \cdot s(k)) = 0$$

$$\sum_{k=0}^{K-1} \sin(2\pi \cdot f_1 \cdot s(k)) = 0$$

$$\sum_{k=0}^{K-1} \sin(2\pi \cdot f_2 \cdot s(k)) = 1.998 \cdot 10^{-15}$$

DISCRETE TIME: $\alpha := 0 \quad \beta := 0 \quad \gamma := 0 \quad \phi := 0 \quad p := 2$ $$\sum_{k=0}^{K-1} \frac{(A \cdot \sin(2\pi \cdot f_0 \cdot s(k) + \alpha) + B \cdot \sin(2\pi \cdot f_1 \cdot s(k) + \beta) + C \cdot \sin(2\pi \cdot f_2 \cdot s(k) + \gamma)) \cdot D \cdot \sin(2\pi \cdot f_p \cdot s(k) + \phi)}{K} \xrightarrow{SIMPLIFY} \frac{1}{2} \cdot D \cdot C$$

CONTINUOUS TIME:

$$\int_0^K \frac{(A \cdot \sin(2\pi \cdot f_0 \cdot s(t) + \alpha) + B \cdot \sin(2\pi \cdot f_1 \cdot s(t) + \beta) + C \cdot \sin(2\pi \cdot f_2 \cdot s(t) + \gamma)) \cdot D \cdot \sin(2\pi \cdot f_p \cdot s(t) + \phi)}{K} dt \xrightarrow{SIMPLIFY} \frac{1}{2} \cdot D \cdot C$$

PLANAR NORMALITY SENSOR

FIELD OF THE INVENTION

This invention relates to sensors using a laser and optical detector, and more particularly, this invention relates to a sensor that determines the planar inclination of a surface.

BACKGROUND OF THE INVENTION

Machine vision systems can be used in workpiece treating and handling systems, such as in a mechanism where a robot arm places a part onto another piece as in automobile manufacturing systems. For example, the robot arm may have to place a part onto a body surface at an angle with respect to that surface. Thus, the planar inclination must be known to allow a motion control device to align to that inclination or some predetermined angle relative to the planar surface.

Some robot assemblies, such as used in the automotive industry, automatically determine the position and attitude of a three-dimensional body at a workstation by using three separate cameras to generate non-overlapping planes of image data. These cameras also target a single point of the body without the use of structured light. Locations of target points are determined and processed within a programmed computer, together with calibration data relating to the expected position of the body in the workstation. An example includes the structure and system disclosed in U.S. Pat. No. 4,639,878 to Day et al.

Usually three cameras or other sensors are used because Euclidian geometry requires a minimum of three points to determine space and position. For example, a work position detection apparatus as disclosed in U.S. Pat. No. 4,831,561 to Utsumi, uses a complicated system of at least three separate, one-dimensional mechanical sensors for generating outputs dependent on the detected position of the work.

In other systems, three different laser beams generate three different colored light beams, which converge into a single light spot on a surface, such as for placing a circuit board into a position at predetermined, incident angles. The three different colored light beams are emitted from circular light sources. The light is reflected from the electronic part or other object and received by pick-up devices. In U.S. Pat. No. 5,298,977, light sources are emitted respectively with the three different colored lights and are arranged so that the light beams converge to a single spot on the surface of the circuit board to detect quantatively the height and incline angle of an electronic part mounted on the circuit board. It also detects a configuration of a mirror surface of an electronic part for the light. However, the use of colored lights in some applications could interfere with each other and cross talk could result.

Other sensors and imaging systems used for workpiece treating or handling include those systems disclosed in U.S. Pat. Nos. 5,331,406 and 4,819,167, such as used for determining the precise location of a moving object. A semiconductor wafer position could be determined relative to a destination position. Also, integrated circuits could be accurately positioned upon surface mounted circuit boards.

However, the above devices and systems typically use separate devices that are spaced apart from each other without a housing or other structure, which are part of a compact integral unit. These sensors described above are typically used to detect the position of a workpiece or object in simple robotic applications.

SUMMARY OF THE INVENTION

It is therefore an object of the present invention to provide a sensor for determining the planar inclination of a surface.

It is still another object of the present invention to provide a sensor for determining the planar inclination of a surface that is part of an integral sensor device.

In accordance with the present invention, a sensor determines planar inclination of a surface and includes a sensor body having a light emitting end. Three Z-axis sensors are positioned within the sensor body. Each Z-axis sensor includes a laser assembly having a light output for emitting a light beam from the light emitting end onto a surface to be scanned. An optical detector receives the scattered light back that had been emitted from the laser assembly onto the surface to be scanned. A processor is operatively connected to the optical detectors for calculating the planar inclination of the surface based on the light scattered back from the surface. In one aspect of the present invention, the laser beams are generated parallel to each other and parallel to the longitudinal axis of the sensor body.

The sensor can include a sine wave generator, such as a digital signal processor, for generating a sine wave modulation for a laser assembly, wherein each laser assembly has a sine wave modulation that is different from the sine wave modulation of a respective other laser assembly. However, it should be understood that the invention is not limited to sine wave modulation. The sine wave modulation can be a function of amplitude, frequency modulation, DC offset, time and phase. In one aspect of the present invention, the laser assemblies can be positioned within the sensor body at a spaced-apart angle of about 1200° with respect to each other.

Each optical detector can be positioned at an angle with respect to the longitudinal axis of the sensor body and to each laser assembly. Each optical detector includes a position sensitive detector and a lens for directing light scattered from the surface to be scanned into the position sensitive detector. The sensor body further comprises a lower housing section that contains the laser assemblies and the lens of each optical detector, and a mid-section that contains each position sensitive detector.

In still another aspect of the invention, the mid-section can further comprise an inside surface having a mirror adjacent each respective position sensitive detector for creating an optical lever and increasing the effective distance that the sensor can be used. An upper section can include a preamplifier connected to each position sensitive detector. Each optical detector can also comprise a narrow bandpass interference filter. Each laser assembly can include a laser diode, beam circularization optics and beam focusing optics. The sensor body is preferably cylindrically configured.

In still another aspect of the present invention, a sensor body is used with a sensor that determines the planar inclination of a surface. The sensor body includes a body member defining a longitudinal axis and having a light emitting end. The body member includes a lower section having three orifices for receiving laser optic assemblies within each orifice. Three other orifices receive receiver optics. A mid-section has a chip seat that receives a position sensitive detector on which scattered light is impinged. An upper section mounts a preamplifier connected to each laser assembly. The mid-section includes an inside surface having a mirror surface adjacent each chip seat for creating an optical lever. The sensor body includes three orifices on the lower section that receives laser optic assemblies and are positioned at a spaced-apart angle of about 1200 with respect to each other.

BRIEF DESCRIPTION OF THE DRAWINGS

Other objects, features and advantages of the present invention will become apparent from the detailed description of the invention which follows, when considered in light of the accompanying drawings in which:

FIG. 1A is a schematic drawing of the position sensitive detector that provides current more on one side, such as the "top," or "left" than the other side, such as the "bottom" or "right."

FIG. 4 is a sectional view taken along line 4—4 of FIG. 3.

FIG. 5 is an isometric view of the upper section forming electronic housing shown in FIG. 3.

FIG. 6 is a sectional view taken along line 6—6 of FIG. 5.

FIG. 7 is an isometric view of the chip seat shown in FIG. 3.

FIG. 8 is a sectional view of the chip taken along line 8—8 of FIG. 7.

FIG. 9 is an isometric view of the mid-section of the sensor body shown in FIG. 3.

FIG. 10 is a sectional view taken along line 10—10 of FIG. 9.

FIG. 11 is an isometric view of a retaining ring used for retaining some of the optics used in the optical detector.

FIG. 12 is an isometric view of a lens support used to receive some of the optical detectors.

FIG. 13 is an isometric view of the lower section of the sensor body.

FIG. 14 is a sectional view taken along line 14—14 of FIG. 13.

FIG. 18 shows some basic equations that are used in the present invention in digital signal processor.

FIG. 19 is a graph showing left and right outputs, such as from the position sensitive detector.

FIGS. 20–26 are various equations and graphs that point out the results of the equations in one specific example of the present invention.

DETAILED DESCRIPTION OF THE PREFERRED EMBODIMENTS

The present invention is advantageous because three independent sensors are mounted in one integral sensor body and include an associated laser assembly and optical detectors that are used to calculate a plane.

Figure 1:
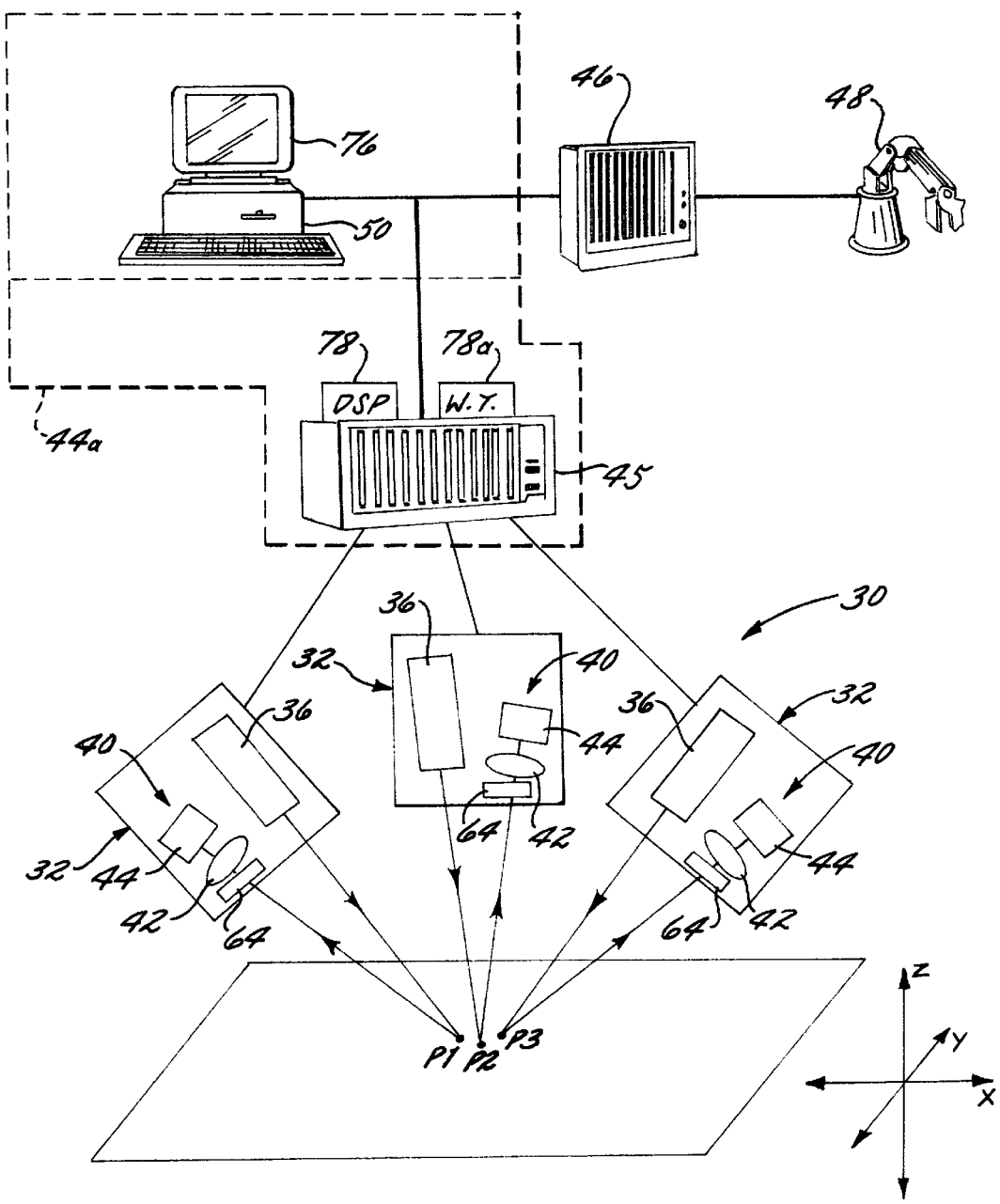
FIG. 1 is a schematic drawing showing three Z-axis sensors, each having a laser assembly and optical detector; a sensor processor; a robot controller; and robot manipulator with a personal computer for system calibration.
Figure 2:
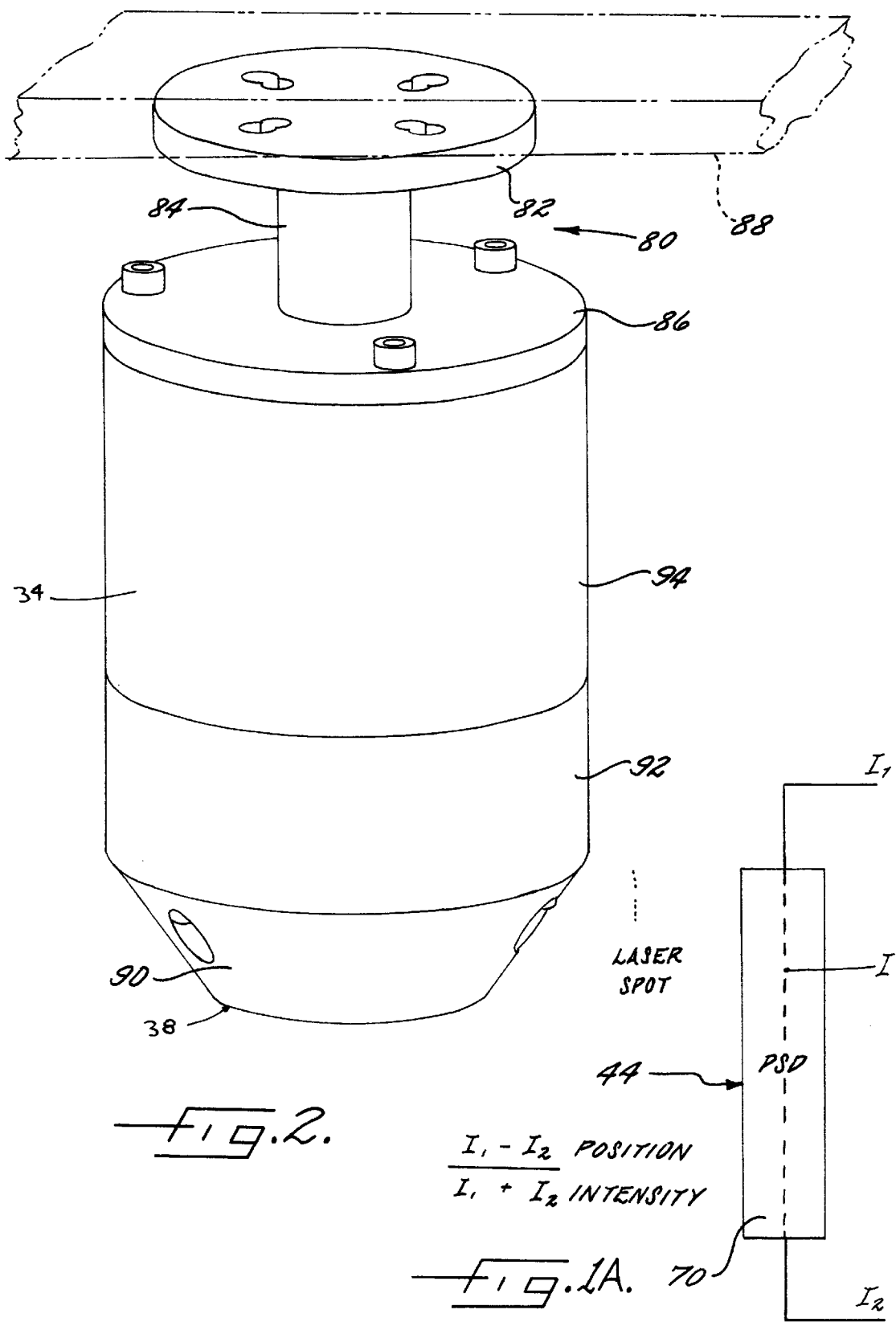
FIG. 2 is an isometric view of the sensor in accordance with the present invention, showing the overall cylindrical configuration.
Figure 3:
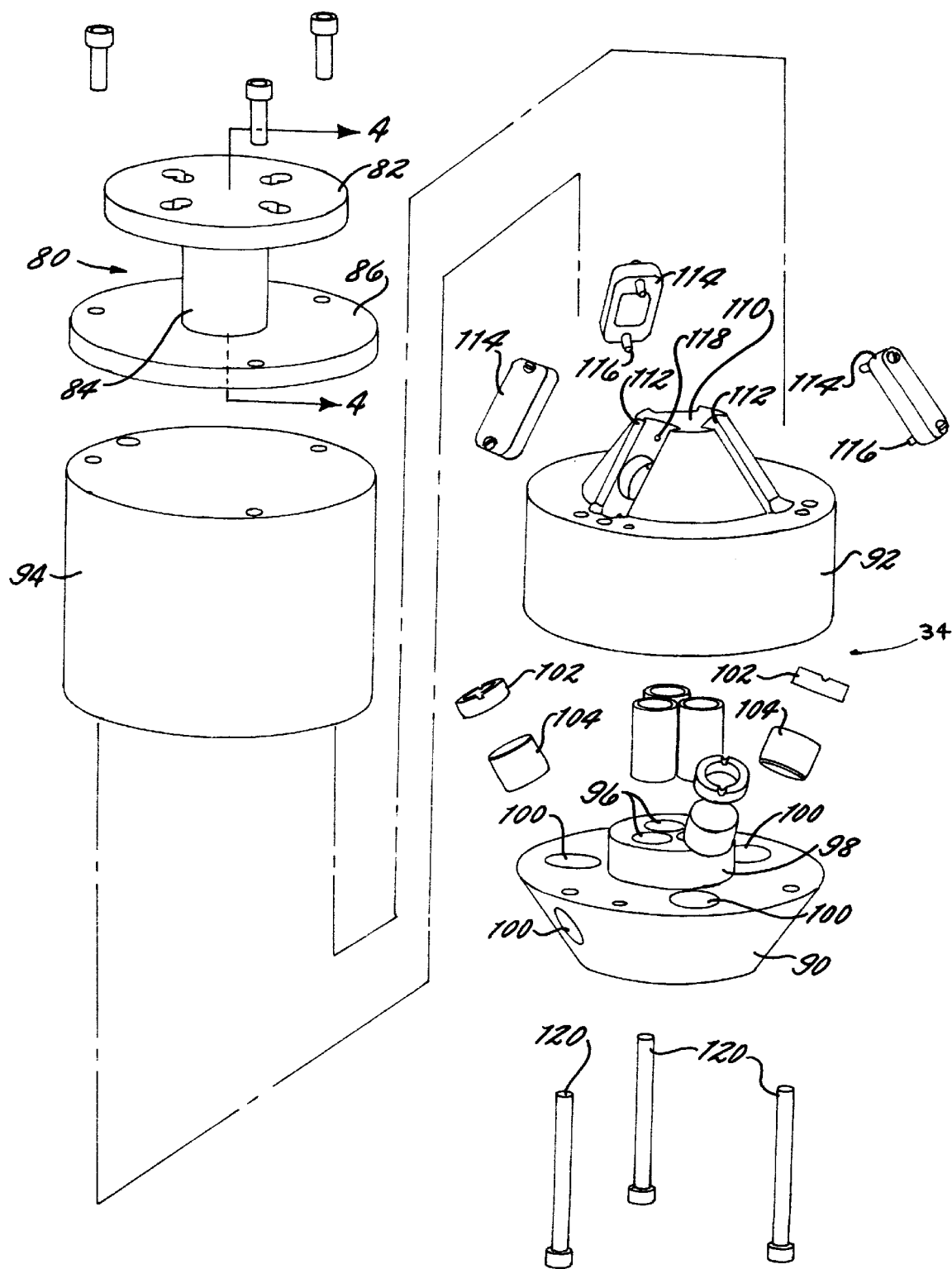
FIG. 3 is an exploded isometric view of the sensor of FIG. 2.

FIGS. 1 through 3 illustrate a general overview of the sensor 30 of the present invention and associated other components. Three Z-axis sensors 32 positioned in a sensor body, indicated generally at 34 (FIG. 2), which forms a body member to hold associated components, as described below.

Each Z-axis sensor 32 includes a laser assembly 36 having a light output parallel to a longitudinal axis of the sensor body 34 for emitting a light beam in the form of a laser beam from the light emitting end 38 (FIG. 2) of the sensor body 34 onto a surface to be scanned. The laser assemblies do not have to be parallel to the axis. However, calculations are simplified in subsequent processing for planar normality. The light is scattered. The light is impinged on the surface at points labeled P1, P2 and P3 in FIG. 1.

An optical detector 40 is positioned within the sensor body 34 adjacent a respective laser assembly 36 and receives scattered light that had been emitted from the respective laser assembly onto the surface to be scanned. Three laser assemblies 36 are illustrated with corresponding three optical detectors 40. Each optical detector 40 includes at least a lens 42 and position sensitive detector 44, which is operatively connected to a system processor 44a (e.g., a sensor processor), which in turn, connects to a robot controller 46 and robot manipulator 48. A personal computer 50 can be part of the system processor 44a and can provide system calibration, data visualization, storage and retrieval or computer aided design (CAD) data image mapping.

As is known to those skilled in the art, the laser assembly could include a laser diode, such as known to those skilled in the art. Beam circularization optics could allow polarization. A beam focusing optic lens, such as known to those skilled in the art, could focus the beam. A laser diode power supply provides power to the laser diode. The optical detector 40 could include a narrow bandpass interference filter 64, the lens 42, and the position sensitive detector 44 as noted before. The position sensitive detector 44 (FIG. 1A) can be formed as a piece of silicon 70 of a semiconductor circuit that produces current more on one side, such as the "top" or "left" than on another side, such as the "bottom" or "right." The processor calculates a position function over intensity function $I1-I2/I1+I2$, as will be explained in detail below.

As known to those skilled in the art, a position sensitive detector is essentially a photodiode that transforms light striking it to an electrical current. Two contacts are placed directly across from each other on an active surface and a pair of electrodes placed such that current that is generated will be divided between the two contacts as shown in FIG. 1A. The active surface functions as a homogenous resistance, such that current in each contact depends linearly on where on the surface the light strikes, i.e., the distance to each contact. The position in the wide direction can be obtained from the simple formula $(Y1-Y2)/(Y1+Y2)$, where Y1 and Y2 are the currents from each contact. This is also expressed in the previous formula of $I1-I2/I1+I2$. A linear position sensitive detector can be formed as a linear detector having one electrode on the silicon chip back side.

Examples of a position sensitive detector that can be used with the present invention are the position sensitive detectors manufactured by SiTek Electro Optics of Ogardesvagen, 13A, 433 30 Partille, Sweden. It is possible to measure changes in position with a position sensitive detector as small as several nanometers.

A respective position sensitive detector preamplifier 72 (FIG. 6) can be connected to each position sensitive detector 44, and receives signals from the position sensitive detector 44, which can then forward signals to a system processor 44a having a computer 45 acting as a detector signal conditioner and analog-to-digital converter and into a sensor processor for determining and calculating the planar inclination of a surface based on scattered light from the surface to be scanned. The sensor processor could be a separate computer 45 that includes the appropriate sensor drivers and amplifiers, or could also be part of a personal computer 50. A monitor 76 can display the position information. The system processor 44a also includes a digital signal processor 78 used to modulate the laser, as will be described further below.

FIG. 2 illustrates an isometric view of the sensor 30 in accordance with the present invention. The sensor 30 is cylindrically configured to define a longitudinal axis. The sensor includes a mounting flange 80 that has a mounting flange 82 and neck 84, which connects onto the sensor body 34 of the present invention. A support flange 86 can connect onto an attachment piece 88 of a robot arm or other work handling apparatus.

The sensor body 34 includes a lower section 90, a mid-section 92 and an upper section 94. The three sections 90, 92 and 94 form the sensor body 34 defining a longitudinal axis with a light emitting end 38 defined by the truncated face of a cone-like structure forming the lower section.

In the illustrated aspect of the present invention, the lower section 90 has three orifices 96 that are spaced about 120° apart to receive laser assemblies 36 within each orifice. This is only one spacing, which can vary. The orifices 96 are preferably substantially parallel to the longitudinal axis of the sensor body 34. The laser assemblies 36 could be spaced to form a small central area within the lower section 90 to receive a cutting tool or other manipulating tool through the center of the lower section. However, in the embodiment of FIG. 3, the three orifices 96 are positioned relatively close to each other such that the three laser assemblies form a substantially triangular configuration. The three orifices 96 are formed into a cylindrically configured protrusion 98, which is formed on the upper surface of the truncated cone that forms the lower section, as illustrated in FIGS. 3, 13 and 14.

Three other orifices 100 are inclined with respect to the longitudinal axis for receiving receiver optics, such as the lens 42 and narrow bandpass interference filter 64. The lens 42 and narrow bandpass interference filter 64, can be formed as one device referred to as a filter/lens assembly. A retaining ring 102 can retain the filter/lens assembly within a filter/lens support 104, shown in FIG. 1A. The laser assemblies 36 can also be mounted in a cylindrically configured laser assembly support 36, as shown in FIG. 3.

The mid-section 92 is also formed as a cylindrical section (FIGS. 9 and 10) that includes a pyramidal shaped extension 110 from the cylindrical section that has three slots 112 to receive in each slot a chip seat 114 (FIGS. 7 and 8) to hold the position sensitive detector 44. The chip seat 114 is formed as a substantial rectangular configured member, such as formed from plastic, and includes attachment pins 116 that are guided into receiving holes 118 in the slots 112. The position sensitive detector 44 is received inside a formed opening of the chip seat 114. Appropriate fasteners, such as bolts 120, are used to hold the bottom section onto the mid-section.

In one preferred aspect of the present invention as shown in FIGS. 9 and 10, the mid-section includes an inside surface 122 having a formed, flat surface 124 that is substantially planar to receive a mirror 126 within the inside surface of the mid-section. The mirror 126 is positioned adjacent each respective position sensitive detector 44 and creates an optical lever for increasing the effective distance that the sensor can be used. For example, if the sensor could only be used within one inch of a planar surface, the use of the mirrors 126 could extend the effective distance to about three inches depending on the position of the position sensitive detector relative to the mirror and surface.

An upper section 94 forms an electronic housing and is positioned on top of the mid-section 92 and held by the bolts 120 that connect both the lower and mid-sections 90,92. The electronic housing can include an appropriate position sensitive detector preamplifiers 72. Other electronic components, as known to those skilled in the art, e.g., a power supply and necessary for use in the sensor, can be included as part of the system processor 44a. The upper section can include an access port 128 as shown in FIGS. 5 and 6 to allow control cables to be inserted into the electronic housing. Also, signal wires can extend from the electronics within the electronic housing back into the sensor processor as part of the system processor 44a.

In the illustrated embodiment, the configuration of having laser assemblies 36 mounted parallel to the longitudinal axis of the body member 34 is advantageous because the laser beams (seen as dots P1, P2 and P3 on the surface being measured) do not diverge or converge as the sensor 30 is withdrawn from or approached toward the surface. Any extra motion causing divergence and convergence could add complex angle offsets to the orientation and range calculations and make orientation calculations dependent on precise knowledge of the Z-axis sensors initial position and orientation in space. When the laser assemblies 36 are pointed straight down along the principle axis of the sensor, the Z-axis sensors 32 are mechanically decoupled so that the X-Y position of each of the laser dots P1, P2 and P3 on the surface being measured are independent of the sensor's 30 relative distance from the surface.

In the basic system, each laser beam is modulated by a different frequency from the frequency used to modulate the other lasers. The laser is modulated with a sine wave and then it is multiplied by exactly what was sent out on the return. The system synchronously amplifies. The calculations are performed within the system processor and the sine wave can be generated in the digital signal processor 78 and can be phase locked. Thus, there is no guess work and all can be done in the code in the digital signal processor.

Values can be stored in a wave-table of a data store. Those values are used to modulate each of the three laser assemblies. The wave-table could be part of a wave-table database 78a coupled to the sensor processor within the computer. In the explanation described below, the system is done in discrete time and the lasers are multiplied by a modulation function. There are three different amplitudes and three different lasers. The sine waves are a frequency that are prime relative to each other, i.e., not divisible by each other, and thus cannot be multiples of each other.

It is possible to take the composite and multiply it by the modulation function and integrate over a complete cycle. One of the modulations can be done for each leg corresponding to a respective laser assembly to obtain the information for each leg to form the demodulation scheme. As noted before, the position sensitive detector 44 can be the sheet of silicon, forming the semiconductor, and the laser beam is located in some position of the position sensitive detector. Typically, more current will be produced on one side (such as "the top" or "left") than the other side (such as "the bottom" or "right") FIG. 1B. If the optics or reflection are changed, then the spot on the position sensitive detector can move back and forth and the spot can move up and down. In the basic concept, a smaller current is subtracted from a larger current and vice versa and they are added together within the digital signal processor. Thus, the system is normalized so that it is intensity independent. As shown in FIG. 1A, the numerator would be the "position." If the spot is completely in the middle, then I1−I2=0. The I1+I2 makes the system intensity independent and if the spot gets lighter or darker, then the position would change. It is the division of I1−I2 by I1+I2 that creates the intensity independence. The word for this is "ratiometric." Further details are known to those skilled in the art and can be found in such manufacturer's information as SiTek Electro Optics noted above.

As noted before, the sensor 30 of the present invention consists of three displacement/position Z-axis sensors 32 used to calculate a plane in space using each of the three points. Each of the three legs produced by a laser beam uses the position sensitive detector (PSD) 44 to determine the Z component of each point. The following description applies to the modulation and demodulation of the laser used on a single leg to minimize the effects of the need for optical filters by using three different relatively prime frequencies to modulate the lasers. The stimulus for each leg would be a continuous laser with the sine wave modulation superimposed. The position sensitive detector 44 detects the energy from the laser on the surface and produces a signal from each side of the detector ("top" or "left" and "bottom" or "right") of the detector corresponding to the position of the received spot along the position sensitive detector.

If it is assumed that the incident laser modulation is:

$$I(t)=L \cdot \sin(2 \cdot \pi \cdot t)$$

and that the detected signals in the position sensitive detector 44 are (with magnitudes top and bottom):

| | |
|---|---|
| T(t) = Top · sin (2 · π · t + θ) + Ot | Top of the PSD plus some phase delay and offset |
| B(t) = Bottom · sin (2 · π · t + θ) + Ob | Bottom of the PSD plus phase delay and offset |

The phase delay and the offset would be due to the electronics in the system and the average received power on the position sensitive detector.

The incident function is used to demodulate the returns over a complete cycle:

$$\text{Top}(t)=\int^1_0 I(t) \cdot T(t) dt$$

$$\text{bottom}(t)=\int^1_0 I(t) \cdot B(t) dt$$

In a multiple leg (laser) system, the integration time would have to include a complete (integral) number of cycles for all legs in the system. These simplify to the following which are purely DC terms:

$$\text{top}(t) \text{simplify} \rightarrow 1/2 \cdot L \cdot Top \cdot \cos(\theta)$$

$$\text{bottom}(t) \text{simplify} \rightarrow 1/2 \cdot L \cdot Bottom \cdot \cos(\theta)$$

where φ is a constant in the system
To find a position using a position sensitive detector, the last step is:

$$\frac{(\text{top}(t) - \text{bottom}(t))}{(\text{top}(t) + \text{bottom}(t))} \text{simplify} \rightarrow \frac{-(-\text{Top} \cdot \cos(\theta) + \text{Bottom} \cdot \cos(\phi))}{(\text{Top} \cdot \cos(\theta) + \text{Bottom} \cdot \cos(\phi))}$$

The digital signal processor (DSP) 78 implements this process in discrete time. The DSP also generates the modulation for the incident wave which guarantees phase lock with the returns.

As an example, the psd function output (psd) is defined as a function of amplitude (A), frequency of modulation (f), DC offset (d), time (t) and phase. The modulation would be produced by the DSP via a DAC (one or each channel) and would be at different frequencies.

$$psd(A,f,d,t,\phi)=A \cdot \sin(2 \cdot \pi \cdot f \cdot t + \phi)+d$$

$$\text{mod}(A,f,t)=A \cdot \sin(2\pi \cdot f \cdot t)$$

The composite signal for each leg of the sensors 30 would be the sum of the three channels. Each position sensitive detector 44 would be aligned with its leg and the signal from the other two lasers would be much less than what is shown below. In the example, there are unrealistic DC levels included, and this would be what the total signal is received by each leg.

$$\int^1_0 psd(A1,2,f,del,t,0) \cdot \text{mod}(M1,2,f,t) dt \text{simplify} \rightarrow 1/2 \cdot M1 \cdot A1$$

$$\int^1_0 psd(A2,3,f,dc2,t,0) \cdot \text{mod}(M2,3,f,t) dt \text{simpify} \rightarrow 1/2 \cdot M2 \cdot A2$$

$$\int^1_0 psd(A3,5,f,Dc3,t,0) \cdot \text{mod}(M3,5,f,t) dt \text{simplify} \rightarrow 1/2 \cdot M3 \cdot A3$$

If all three position sensitive detectors 44 are seeing some signal, the result is the same. A composite of the three signals would be the same. Extracting one leg (leg 2) would be shown with some phase error. There are no DC terms in the result:

$$\int^1_0 (psd(A1,2,f,Dc1,t,0)+psd(A2,3,f,Dc2,t,\phi)+psd(A3,5,f,Dc3,t,0)) \cdot \text{mod}(M2,3,f,t) dt \text{simplify} \rightarrow 1/2 \cdot M2 \cdot A2 \cdot \cos(\phi)$$

The phase error is a constant for any given system and the effects would be removed at calibration.

In another example, "real signals" with different amplitudes of outrageous DC levels and the multipliers 2, 3 and 5 are shown.

| | | | |
|---|---|---|---|
| A1 = 2 | A2 = 3 | A3 = 5 | Amplitudes of received signals |
| L1(a,t,f) = psd(a,2 · f,-.5,t,0) | | | Leg 1 at frequency times 2 |
| L2(a,t,f) = psd(a,3 · f,.9,t,0) | | | Leg 2 at frequency times 3 |
| L3(a,t,f) = psd(a,5 · f,3,t,0) | | | Leg 3 at frequency times 5 |

Figure 16:
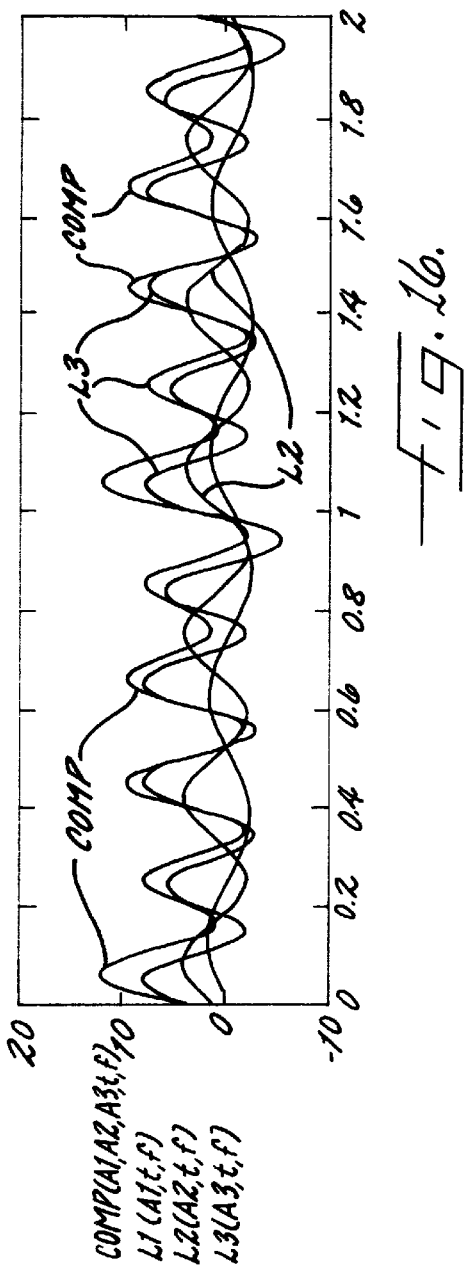
FIG. 16 is a graph showing the composite signal from three different sine wave frequencies for three different legs corresponding to the three different lasers, L1, L2 and L3.

The composite signal is shown in FIG. 16:

$$\text{comp}(a1,a2,a3,t,f)=L1(a1,t,f)+L2(a2,t,f)+L3(a3,t,f)$$

Figure 17:
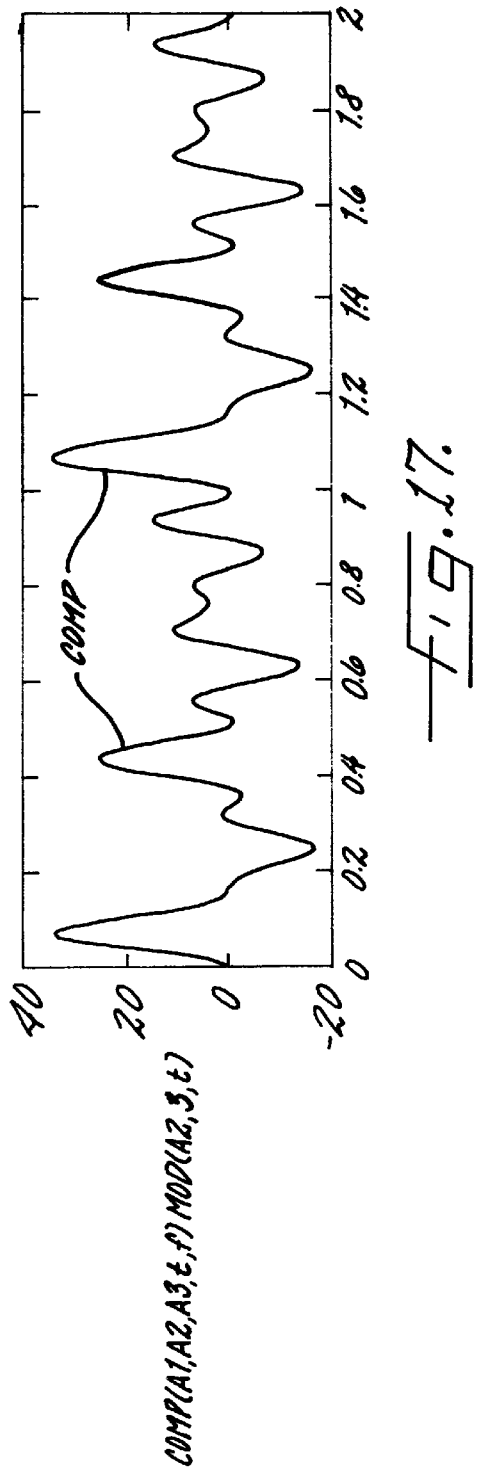
FIG. 17 is another graph showing an example of the modulation amplitude for the composite signal.

As an example, when L2 is used as the modulation amplitude, the result is shown in FIG. 17. Integrating over the base frequency, the result from above should be 3*3/2 or 4.5.

$$\int^1_0 \text{comp}(A2,A2,A3,t,f) \cdot \text{mod}(A2,3 \cdot f,t) dt \text{simplify} \rightarrow 4.49999999999$$

Figure 15:
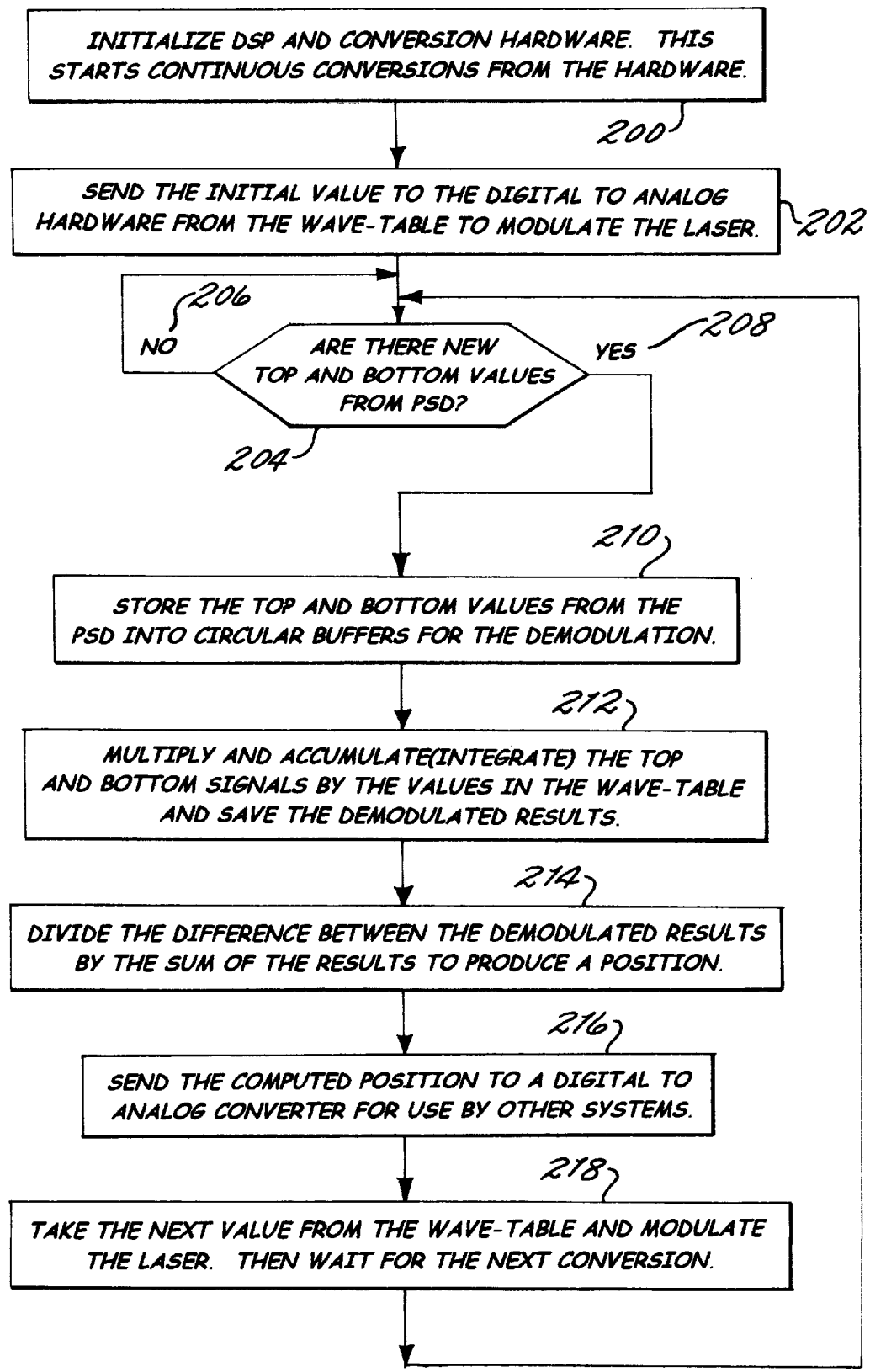
FIG. 15 is a flow chart illustrating one aspect of the method that can be used with the present invention.

FIG. 15 illustrates a flow chart showing one basic method aspect of the present invention that works in conjunction with the system and method described above. As shown in block 200, the digital signal processor is initialized together with any conversion hardware. This starts any continuous conversions from the hardware. In block 202, an initial value is sent to the digital-to-analog hardware from the wave-table to modulate the laser. The system determines if there are any new top and bottom values from the position sensitive detector at block 204. If there are no new values, then the system repeats. If there are new values in block 208, then the top and bottom values from the position sensitive detector are stored into circular buffers, such as in a memory for the demodulation. The top and bottom signals are multiplied and accumulated (integrated) by the values in the wave-table and the demodulated results are saved (block 212). The difference between the demodulated results is divided by the sum of the results to produce a position (block 214). The computed position is then sent to a digital-to-analog converter for use by other portions of the system (block 216). The next value from the wave-table is used to modulate a laser and the system waits for the next conversion (block 218).

FIG. 19 is a graph showing the numerical example for left and right waveform signals where the right waveform signal is larger than the left waveform signal. The example is an integer frequency. FIG. 18 shows basic calculations for a frequency of 5. D corresponds to the drive signal and K is the number of samples. P represents the position with the formulas as noted above with the left and right relative to the intensity. FIG. 20 shows some of the calculations behind the graph results shown in FIG. 19. As noted in FIG. 20, the calculations obtain the difference in the sum of two signals, which equals 0.21.

Figures 21, 22:
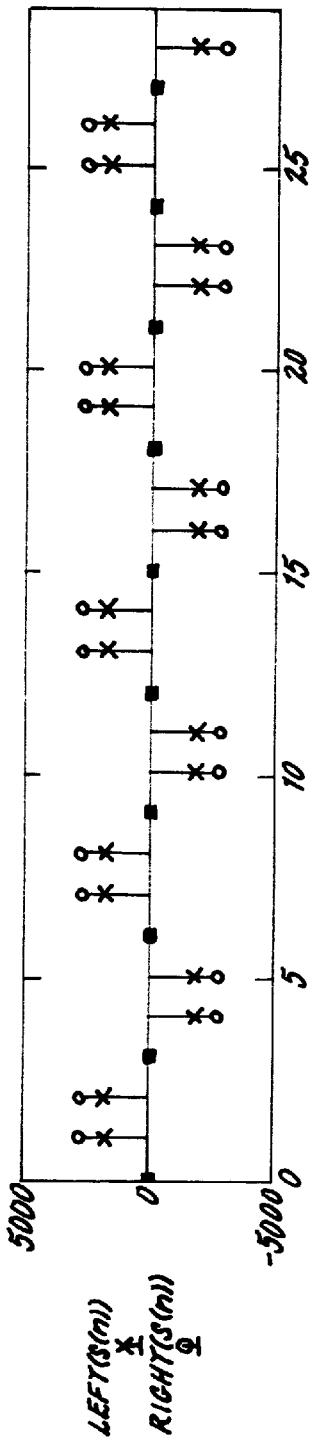
Figures 23, 24:
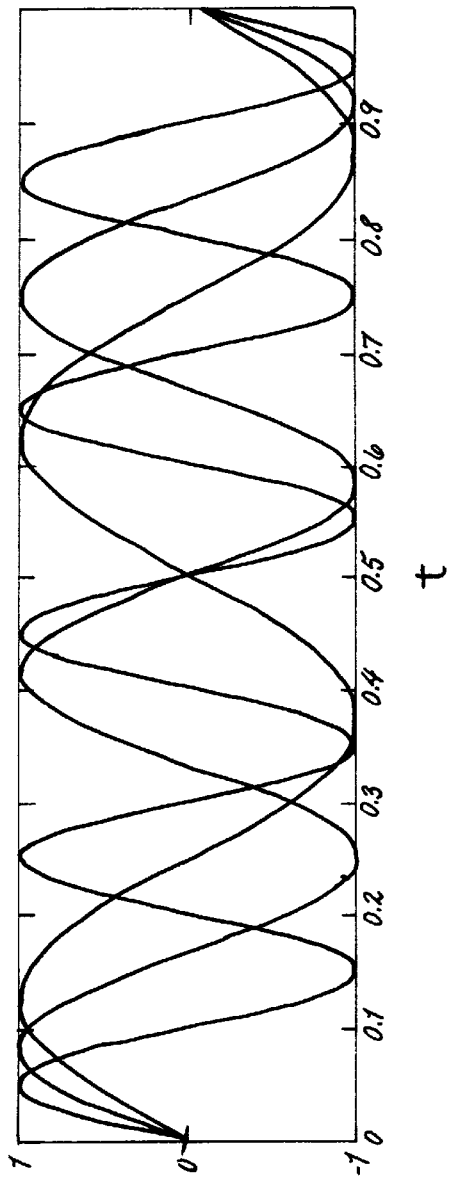
Figure 25:
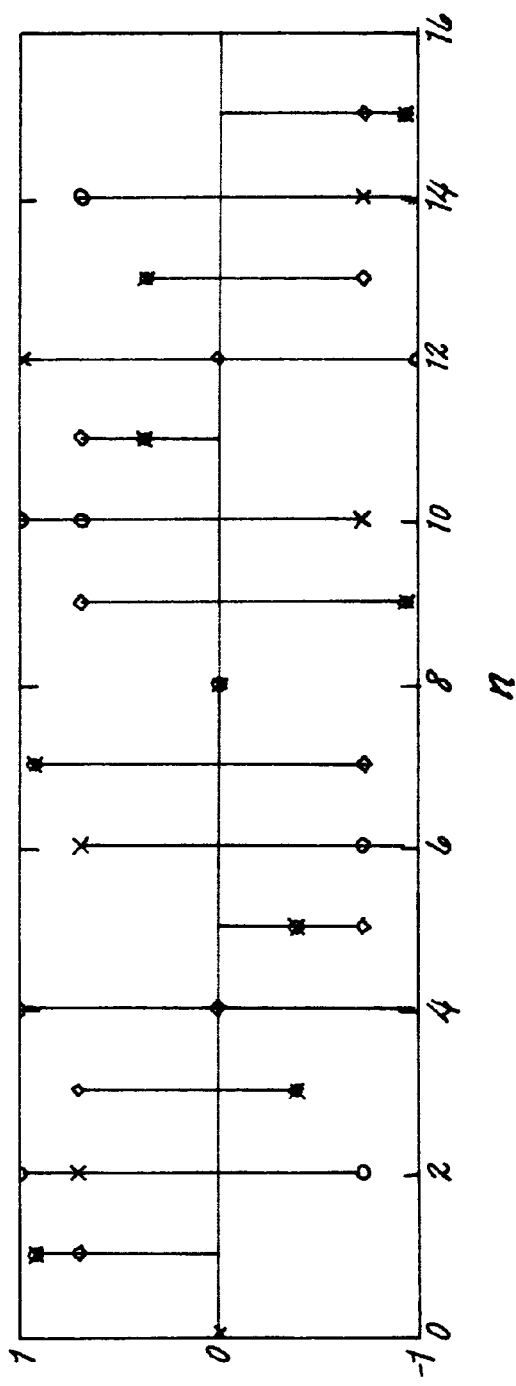

FIG. 21 shows the actual multiplication and FIG. 22 shows summations of discrete times such as done on a computer to obtain the sums. FIG. 23 illustrates three relatively prime frequencies relative to each other of 2, 3 and 5. Thus, it is evident that two complete cycles are obtained to obtain the same finish point as shown in FIG. 24. Thus, they are integer frequencies. FIG. 25 is another output graph and FIG. 26 shows the discrete timing and continuous time equations that can be used with the present invention.

This application is related to copending patent application entitled, "METHOD OF DETERMINING THE PLANAR INCLINATION OF A SURFACE," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A sensor for determining the planar inclination of a surface comprising:
   a sensor body having a light emitting end and defining a longitudinal axis;
   three sensors positioned within said sensor body, each sensor comprising:
      a laser assembly having a light output for emitting a light beam from the light emitting end in a longitudinal direction substantially parallel to the longitudinal axis onto a surface to be scanned; and
      an optical detector for receiving scattered light that had been emitted from said laser assembly onto a surface to be scanned;
   a processor operatively connected to said optical detectors for calculating the planar inclination of the surface based on the light scattered back from the surface to be scanned; and
   a sine wave generator for generating a sine wave modulation for a laser assembly, wherein each laser assembly has a sine wave modulation that is different from the sine wave modulation of a respective other laser assembly based on stored values within a wave table, wherein the sine waves are a frequency that are prime relative to each other.

2. A sensor according to claim 1, wherein said sine wave generator further comprises a digital signal processor (DSP).

3. A sensor according to claim 1, wherein said sine wave modulation is a function of amplitude, frequency of modulation, DC offset, time and phase.

4. A sensor according to claim 1, wherein said laser assemblies are positioned within said sensor body at a spaced-apart angle of about 120 degrees with respect to each other.

5. A sensor according to claim 1, wherein each optical detector is positioned at an angle with respect to the longitudinal axis of the sensor body and to each laser assembly.

6. A sensor according to claim 1, wherein each optical detector comprises a position sensitive detector and a lens for directing light reflected from a surface to be scanned into the position sensitive detector.

7. A sensor according to claim 6, wherein said sensor body further comprises a lower section that contains said laser assemblies and said lens of each optical detector, and a mid-section that contains each position sensitive detector.

8. A sensor according to claim 7, wherein said mid-section further comprises an inside surface having a mirror adjacent each respective position sensitive detector for creating an optical lever and increasing the effective distance that the sensor can be used.

9. A sensor according to claim 1, wherein said body further comprises an upper section including a preamplifier connected to each position sensitive detector.

10. A sensor according to claim 1, wherein each optical detector further comprises a filter.

11. A sensor according to claim 1, wherein each laser assembly further comprises a laser diode, beam circularization optics and beam focusing optics.

12. A sensor according to claim 1, wherein said sensor body is cylindrically configured.

13. A sensor for determining the planar inclination of a surface comprising:
   a sensor body having a light emitting and;
   three laser assemblies mounted within the sensor body, wherein each laser assembly has a light output for emitting a light beam from the light emitting end onto a surface to be scanned;
   three optical detectors each associated with a respective laser assembly and positioned within the sensor body and positioned for receiving scattered light that had been emitted from an associated laser onto a surface to be scanned;
   a processor operatively connected to said three optical detectors for calculating the planar inclination of the surface based on the light reflected back from the reflection points on the surface; and
   a sine wave generator for generating a sine wave modulation for a laser assembly, assembly has a sine wave modulation that is different from the sine wave modulation of a respective other laser assembly based on stored values within a wave table, wherein the sine waves are a frequency that are prime relative to each other.

14. A sensor according to claim 13, wherein said sine wave generator further comprises a digital signal processor (DSP).

15. A sensor according to claim 13, wherein said sine wave modulation is a function of amplitude, frequency of modulation, DC offset, time and phase.

16. A sensor according to claim 13, wherein said laser assemblies are positioned within said sensor body at a spaced-apart angle of about 120 degrees with respect to each other.

17. A sensor according to claim 13, wherein each optical detector is positioned at an angle with respect to the longitudinal axis of the sensor body.

18. A sensor according to claim 13, wherein each optical detector comprises a position sensitive detector and lens for directing light reflected from a surface to be scanned into the position sensitive detector.

19. A sensor according to claim 18, wherein said sensor body further comprises a lower housing section that contains said laser assemblies and said lens of each optical detector and a mid-section that contains each position sensitive detector.

20. A sensor according to claim 19, wherein said mid-section further comprises an inside surface having a mirror adjacent each respective position sensitive detector for creating an optical lever and increasing the effective distance that the sensor can be used.

21. A sensor according to claim 20, wherein said body further comprises an upper section including a preamplifier connected to each position sensitive detector.

22. A sensor according to claim 13, wherein each optical detector further comprises a filter.

23. A sensor according to claim 13, wherein each laser assembly further comprises a laser diode, beam circularization optics and beam focusing optics.

24. A sensor according to claim 13, wherein said sensor body is cylindrically configured.

25. A sensor body for use with a sensor that determines the planar inclination of a surface comprising:
 a body member defining a longitudinal axis and having a light emitting end, said body member further comprising:
  a lower section having three orifices for receiving respective laser optic assemblies within each orifice, and three orifices inclined with respect to the longitudinal axis for receiving receiver optics;
  a mid-section having three chip seats that each receive a position sensitive detector on which reflected light is impinged; and
  an upper section for holding respective preamplifiers, each connected to each position sensitive detector, wherein each laser assembly is adapted to be modulated with a different sine wave frequency based on stored values within a wave table, wherein the sine waves are a frequency that are prime relative to each other.

26. A sensor body according to claim 25, wherein said mid-section further comprises an inside surface having a mirror surface adjacent each chip seat for creating an optical lever and increasing the effective distance that a sensor can be used.

27. A sensor body according to claim 25, wherein said three orifices of said lower section that receive laser optic assemblies are positioned at a spaced-apart angle of about 120 degrees with respect to each other.

28. A sensor for determining the planar inclination of a surface comprising:
 a sensor body defining a longitudinal axis and having a light emitting end and defining a longitudinal axis;
 three sensors positioned within said sensor body, each sensor comprising:
  a laser assembly having a light output parallel to the longitudinal axis of the sensor for emitting a light beam from the light emitting end in a longitudinal direction substantially parallel to the longitudinal axis onto a surface to be scanned; and
  an optical detector for receiving scattered light that had been emitted from said laser assembly onto a surface to be scanned;
 a processor operatively connected to said optical detectors for calculating the planar inclination of the surface based on the light scattered back from the surface to be scanned; and
 a sine wave generator for generating a sine wave modulation for a laser assembly, wherein each laser assembly has a sine wave modulation that is different from the sine wave modulation of a respective other laser assembly based on stored values within a wave table, wherein the sine waves are a frequency that are prime relative to each other.

29. A sensor according to claim 28, wherein said sine wave generator further comprises a digital signal processor (DSP).

30. A sensor according to claim 28, wherein said sine wave modulation is a function of amplitude, frequency of modulation, DC offset, time and phase.

31. A sensor according to claim 28, wherein said laser assemblies are positioned within said sensor body at a spaced-apart angle of about 120 degrees with respect to each other.

32. A sensor according to claim 28, wherein each optical detector is positioned at an angle with respect to the longitudinal axis of the sensor body and to each laser assembly.

33. A sensor according to claim 28, wherein each optical detector comprises a position sensitive detector and a lens for directing light reflected from a surface to be scanned into the position sensitive detector.

34. A sensor according to claim 33, wherein said sensor body further comprises a lower section that contains said laser assemblies and said lens of each optical detector, and a mid-section that contains each position sensitive detector.

35. A sensor according to claim 34, wherein said mid-section further comprises an inside surface having a mirror adjacent each respective position sensitive detector for creating an optical lever and increasing the effective distance that the sensor can be used.

36. A sensor according to claim 28, wherein said body further comprises an upper section including a laser power supply and amplifier for each position sensitive detector.

37. A sensor according to claim 28, wherein each optical detector further comprises a narrow band-pass interference filter.

38. A sensor according to claim 28, wherein each laser assembly further comprises a laser diode, beam circularization optics and beam focusing optics.

39. A sensor according to claim 28, wherein said sensor body is cylindrically configured.

40. A sensor body for use with a sensor that determines the planar inclination of a surface comprising:
 a body member defining a longitudinal axis and having a light emitting end, said body member further comprising:

a lower section having three orifices for receiving respective laser optic assemblies within each orifice, said orifices being substantially parallel to the longitudinal axis of the body member, and three orifices inclined with respect to the longitudinal axis for receiving receiver optics;

a mid-section having three chip seats that each receive a position sensitive detector on which scattered light is impinged; and an upper section for mounting respective preamplifiers, each connected to each position sensitive detector, wherein each laser assembly is adapted to be modulated with a different sine wave frequency based on stored values within a wave table, wherein the sine waves are a frequency that are prime relative to each other.

41. A sensor body according to claim 40, wherein said mid-section further comprises an inside surface having a mirror surface adjacent each chip seat for creating an optical lever and increasing the effective distance that a sensor can be used.

42. A sensor body according to claim 40, wherein said three orifices of said lower section that receive laser optic assemblies are positioned at a spaced-apart angle of about 120 degrees with respect to each other.

* * * * *

UNITED STATES PATENT AND TRADEMARK OFFICE
CERTIFICATE OF CORRECTION

PATENT NO. : 6,327,520 B1
DATED : December 4, 2001
INVENTOR(S) : Hooker et al.

It is certified that error appears in the above-identified patent and that said Letters Patent is hereby corrected as shown below:

Column 7,
Line 42, delete "$B(t) = Bottom \bullet \sin(2 \bullet \pi \bullet t + \theta) + Ob$", substitute
-- $B(t) = Bottom \bullet \sin(2 \bullet \pi \bullet t + \phi) + Ob$ --

Signed and Sealed this

Sixteenth Day of April, 2002

JAMES E. ROGAN
*Director of the United States Patent and Trademark Office*

*Attest:*

*Attesting Officer*